(12) United States Patent
Masuzawa et al.

(10) Patent No.: US 10,044,251 B2
(45) Date of Patent: Aug. 7, 2018

(54) LINEAR MOTOR

(71) Applicant: Hitachi Metals, Ltd., Tokyo (JP)

(72) Inventors: Masahiro Masuzawa, Takasaki (JP);
Masahiro Mita, Takasaki (JP)

(73) Assignee: Hitachi Metals, Ltd., Tokyo (JP)

( * ) Notice: Subject to any disclaimer, the term of this patent is extended or adjusted under 35 U.S.C. 154(b) by 316 days.

(21) Appl. No.: 14/777,731

(22) PCT Filed: Mar. 17, 2014

(86) PCT No.: PCT/JP2014/057141
§ 371 (c)(1),
(2) Date: Sep. 16, 2015

(87) PCT Pub. No.: WO2014/148434
PCT Pub. Date: Sep. 25, 2014

(65) Prior Publication Data
US 2016/0301294 A1    Oct. 13, 2016

(30) Foreign Application Priority Data

Mar. 22, 2013   (JP) ................................ 2013-060515

(51) Int. Cl.
*H02K 44/00*    (2006.01)
*H02K 41/02*    (2006.01)
(Continued)

(52) U.S. Cl.
CPC ............... *H02K 41/02* (2013.01); *H02K 1/14* (2013.01); *H02K 1/34* (2013.01); *H02K 41/033* (2013.01)

(58) Field of Classification Search
CPC ............ H02K 41/02; H02K 1/14; H02K 1/34; H02K 41/033
(Continued)

(56) References Cited

U.S. PATENT DOCUMENTS 4,563,602 A * 1/1986 Nagasaka .............. H02K 37/20
                                                      310/12.17
4,857,781 A * 8/1989 Shih ........................ H02K 7/09
                                                       310/12.08
(Continued)

FOREIGN PATENT DOCUMENTS

CN        101496264 A    7/2009
CN        102792571 A    11/2012
(Continued)

OTHER PUBLICATIONS

English Translation of International Search Report for PCT/JP2014/057141 dated May 27, 2014, 2 pages.

*Primary Examiner* — Forrest M Phillips
(74) *Attorney, Agent, or Firm* — Rudy J. Ng; Bret E. Field; Bozicevic, Field & Francis LLP

(57) ABSTRACT

An object is to provide a linear motor in which even when the overall length of the linear motor is long, the amount of magnets to be employed does not increase and hence size reduction and weight reduction of a stator is realized.
A linear motor comprising a stator 2 and a movable element 1 provided with a coil 1a is characterized in that: the stator 2 includes two plate-shaped parts elongated in a moving direction of the movable element 1 and the two plate-shaped parts are provided facing each other so as to be magnetically linked in such a manner that a movement domain of the movable element 1 is located in between; in each of surfaces facing each other in the two plate-shaped parts, a plurality of tooth parts 21a and 22a are aligned in the moving direction such that the tooth parts 21a (22a) of one plate-shaped part and the tooth parts 22a (21a) of the other plate-shaped part are located in a staggered manner; in the movable element 1, inside the coil 1a, two magnets 1c, 1d and three yokes 1b are alternately arranged along the moving direction; and the
(Continued)

two magnets 1c and 1d are magnetized along the moving direction and the magnetization directions are opposite to each other.

12 Claims, 17 Drawing Sheets

(51) Int. Cl.
  *H02K 41/03* (2006.01)
  *H02K 1/14* (2006.01)
  *H02K 1/34* (2006.01)
(58) Field of Classification Search
  USPC .. 310/12, 12.15, 12.05, 12.04, 12.07, 12.09, 310/12.26, 12.24, 12.28, 12.11, 13
  See application file for complete search history.

(56) References Cited

U.S. PATENT DOCUMENTS

| | | | |
|---|---|---|---|
| 5,010,262 A | 4/1991 | Nakagawa et al. | |
| 5,072,144 A * | 12/1991 | Saito | H02K 41/035 310/12.19 |
| 5,218,250 A | 6/1993 | Nakagawa | |
| 5,661,350 A * | 8/1997 | Lucidarme | H02K 41/033 310/12.24 |
| 6,348,746 B1 * | 2/2002 | Fujisawa | H02K 41/031 310/12.21 |
| 7,362,012 B2 * | 4/2008 | Godkin | H02K 1/18 310/12.25 |
| 7,474,019 B2 * | 1/2009 | Kang | H02K 41/033 310/12.24 |
| 9,156,632 B2 * | 10/2015 | Maeda | B65G 54/02 |
| 9,300,181 B2 * | 3/2016 | Maeda | H02K 5/128 |
| 2002/0043879 A1 * | 4/2002 | Joong | H02K 41/031 310/12.21 |
| 2002/0053835 A1 * | 5/2002 | Joong | H02K 41/031 310/12.21 |
| 2003/0227221 A1 * | 12/2003 | Yamamoto | H02K 29/03 310/12.26 |
| 2009/0289509 A1 | 11/2009 | Hoshi et al. | |
| 2013/0082544 A1 * | 4/2013 | Kaneshige | H02K 41/031 310/12.21 |
| 2013/0093264 A1 * | 4/2013 | Aoyama | H02K 41/031 310/12.05 |
| 2015/0035388 A1 | 2/2015 | Mita et al. | |

FOREIGN PATENT DOCUMENTS

| | | | | |
|---|---|---|---|---|
| DE | WO 2007090776 A1 * | 8/2007 | | H02K 41/033 |
| JP | S62126858 A | 6/1987 | | |
| JP | H0232750 A | 2/1990 | | |
| JP | H03139160 A | 6/1991 | | |
| JP | H0588192 U | 11/1993 | | |
| JP | H08502880 A | 3/1996 | | |
| JP | H11313475 A | 11/1999 | | |
| JP | 2001-045735 A | 2/2001 | | |
| JP | 2001145328 A | 5/2001 | | |
| JP | 2005287185 A | 10/2005 | | |
| JP | 2006136156 A | 5/2006 | | |
| WO | WO2013122031 A1 | 8/2013 | | |

\* cited by examiner

LINEAR MOTOR

This application is the national phase under 35 U. S. C. § 371 of PCT International Application No. PCT/JP2014/057141 which has an International filing date of Mar. 17, 2014 and designated the United States of America.

FIELD

The present invention relates to a linear motor constructed by combining a stator including protruding poles and a movable element including a coil and a magnet.

BACKGROUND

For example, in the field of manufacturing semiconductor manufacturing equipment or liquid crystal display devices, a feed device is required that may linearly transport a processing object such as a large-area substrate at high speed and then perform positioning at an appropriate movement position with precision. In general, a feed device of this kind is realized by converting a revolving motion of a motor serving as a driving source into a linear motion by employing a motion conversion mechanism such as a ball screw mechanism. However, the motion conversion mechanism intervenes and hence places a limit on improvement in the movement speed. Further, the presence of a mechanical error in the motion conversion mechanism causes a problem of insufficiency in the positioning precision.

In order to treat this problem, in recent years, a feed device is employed in which a linear motor from which a linear motion output may be directly extracted is utilized as a driving source. The linear motor includes a stator of linear shape and a movable element moving along the stator. In the feed device described above, a linear motor of moving coil type is employed in which the stator is constructed by aligning a large number of plate-shaped permanent magnets at regular intervals and in which an armature provided with a magnetic pole tooth and an energization coil is employed as the movable element (for example, see Japanese Patent Application Laid-Open Publication No. H3-139160).

SUMMARY

In a linear motor of moving coil type, magnets are arranged in the stator. Thus, when the overall length of the linear motor increases (when the moving distance of the movable element increases), the amount of magnets to be employed increases. In recent years, with increasing price of rare earth, the increase in the amount of magnets to be employed has caused an increase in the cost.

Further, in a three-phase linear motor, in order that the fluctuation width of a resultant thrust force of the three phases that fluctuate depending on the position of the movable element may be reduced, the thrust force waveform per single phase is to be substantially of sine wave. Further, a thrust force is to be ensured.

As one of means for this, in general, a plurality of magnetic poles have been provided in each phase so that pitch reduction has been achieved. However, this has prevented simplification of the movable element structure as well as size reduction and weight reduction of the stator and the movable element.

Further, when pitch reduction is employed, the drive frequency becomes high frequency. Then, this causes a problem of increase in the iron loss of the linear motor itself.

The present invention has been devised in view of the above-described situations. An object thereof is to provide a linear motor in which even when the overall length of the linear motor is long, the amount of magnets to be employed does not increase and hence size reduction and weight reduction of a movable element is realized.

The linear motor according to the present invention is characterized by a linear motor including a stator and a movable element provided with a coil. The stator includes two plate-shaped parts elongated in a moving direction of the movable element and the two plate-shaped parts are provided facing each other so as to be magnetically linked in such a manner that a movement domain of the movable element is located in between. In each of surfaces facing each other in the two plate-shaped parts, a plurality of tooth parts are aligned in the moving direction such that the tooth parts of one plate-shaped part and the tooth parts of the other plate-shaped part are located in a staggered manner. In the movable element, inside the coil, two magnets and three yokes are alternately arranged along the moving direction. The two magnets are magnetized along the moving direction and the magnetization directions are opposite to each other. The two magnets and three yokes have substantially the same length in the normal direction of the surfaces facing each other.

In the present invention, the movable element has a compact configuration constructed from two magnets and three yokes. Thus, even when the pitch of the tooth parts on the stator side is made relatively large, the dimension in the moving direction of the movable element may be made smaller. In other words, in this structure, the pitch of the tooth parts on the stator side may easily be made relatively large. Further, since magnets are not employed in the stator, the amount of magnets to be employed does not increase even when the overall length of the linear motor is long. Moreover, the two magnets and three yokes included in the movable element have substantially the same length in the normal direction of the surfaces facing each other in the two plate-shaped parts. This makes it possible to prevent reduction in the amount of magnetic flux due to leakage of magnetic flux flowing through the magnets and yokes toward the moving direction of the movable element and also to prevent lowering of the thrust force associated therewith.

The linear motor according to the present invention is characterized in that the yoke located between the two magnets is longer in the moving direction than the other two yokes.

In the present invention, the yoke located between the two magnets is made longer in the moving direction than the other two yokes each in contact with one magnet alone. Since the length in the moving direction is, that is, the length of the portion facing the tooth parts is set forth in accordance with the magnetic flux amount exchanged with the magnets, magnetic saturation is difficult to occur in the yoke even when the current amount flowing through the coil increases.

The linear motor according to the present invention is characterized in that the length in the moving direction of the yoke located between the two magnets is twice the length of the other two yokes.

In the present invention, the length in the moving direction of the yoke located between the two magnets is set to be twice the length of the other two yokes, which is preferable for the magnetic flux amount that flows. Thus, in a state that the length in the moving direction of the movable element is made small, magnetic saturation in the yoke is alleviated so that a linear motor having a large thrust force may be obtained.

The linear motor according to the present invention is characterized in that a width in the alignment direction of the tooth parts is longer than an alignment interval of the tooth parts.

In the present invention, the width in the alignment direction of the tooth parts is set wider than the alignment interval of the tooth parts. Thus, a larger thrust force may be obtained.

The linear motor according to the present invention is characterized in that the two magnets and the three yokes form a rectangular parallelepiped shape and the surface on the moving direction side of each magnet and each yoke is inclined relative to a direction perpendicular to the moving direction and perpendicular to the facing direction of the plate-shaped parts.

In the present invention, the surface on the moving direction side of each magnet and each yoke is inclined in a direction perpendicular to the moving direction and to the facing direction of the plate-shaped parts. That is, since a so-called skew arrangement is employed, a detent force is reduced and hence thrust force non-uniformity caused by a difference in the relative position between the stator and the movable element may be reduced.

The linear motor according to the present invention is characterized in that the tooth part has a rectangular parallelepiped shape and any two sides facing each other in a cross section parallel to the plate-shaped part of the tooth part are inclined relative to the moving direction.

In the present invention, the tooth part has a rectangular parallelepiped shape and any two sides facing each other in a cross section parallel to the plate-shaped part of the tooth part are inclined relative to the moving direction. That is, since the tooth parts are in a skew arrangement, a detent force is reduced and hence thrust force non-uniformity caused by a difference in the relative position between the stator and the movable element may be reduced.

The linear motor according to the present invention is characterized in that in the tooth parts provided in the two plate-shaped parts, inclination directions of the two sides of the cross section are opposite to each other.

In the present invention, in the tooth parts provided in the two plate-shaped parts, the inclination direction of the two sides of the cross section are set opposite to each other. That is, the direction that the tooth parts are inclined in one plate-shaped part is set to be different from that in the other. Thus, a twist caused by a situation that the movable element is inclined right and left relative to the moving direction may be suppressed.

The linear motor according to the present invention is characterized by including: a plate-shaped non-magnetic material plate provided between the coil and the side surface parallel to the moving direction of the yoke and the magnet; and an auxiliary plate composed of a plate-shaped non-magnetic and electrically non-conductive material provided in a space between the auxiliary plate and the coil so as to face the non-magnetic material plate with the yoke and the magnet in between.

In the present invention, the non-magnetic and electrically non-conductive material has been provided between the yoke and the coil. Thus, the passage of an eddy current flowing through the yoke is partly cut off and hence an eddy current loss may be made small.

The linear motor according to the present invention is characterized by further including a linkage part linked to the non-magnetic material plate and linking three movable elements arranged in the moving direction.

In the present invention, since the three movable elements are linked, a large thrust force may be obtained in comparison with a case that only one movable element is employed.

The linear motor according to the present invention is characterized in that the non-magnetic material plate includes: a first protruding plate part and a second protruding plate part having plate shapes and facing each other with a winding of the coil in between; and a base part joining the first protruding plate part and the second protruding plate part.

In the present invention, the second protruding plate part provided at the outside of the coil is employed. Thus, the thrust force of the linear motor may be easily transmitted to the outside.

Effect of the Invention

In the present invention, a reduced configuration is employed that the stator is constructed from two magnets and three yokes. Thus, the dimension in the moving direction of the movable element may be made smaller. Further, magnets are not employed in the stator. Thus, an effect is obtained that even when the overall length of the linear motor is long, the amount of magnets to be employed does not increase.

Here, in the present specification and the claims, the terms "armature yoke" and "yoke" are used in the same meaning.

DETAILED DESCRIPTION OF NON-LIMITING EXAMPLE EMBODIMENTS

Embodiment 1

Figure 1:
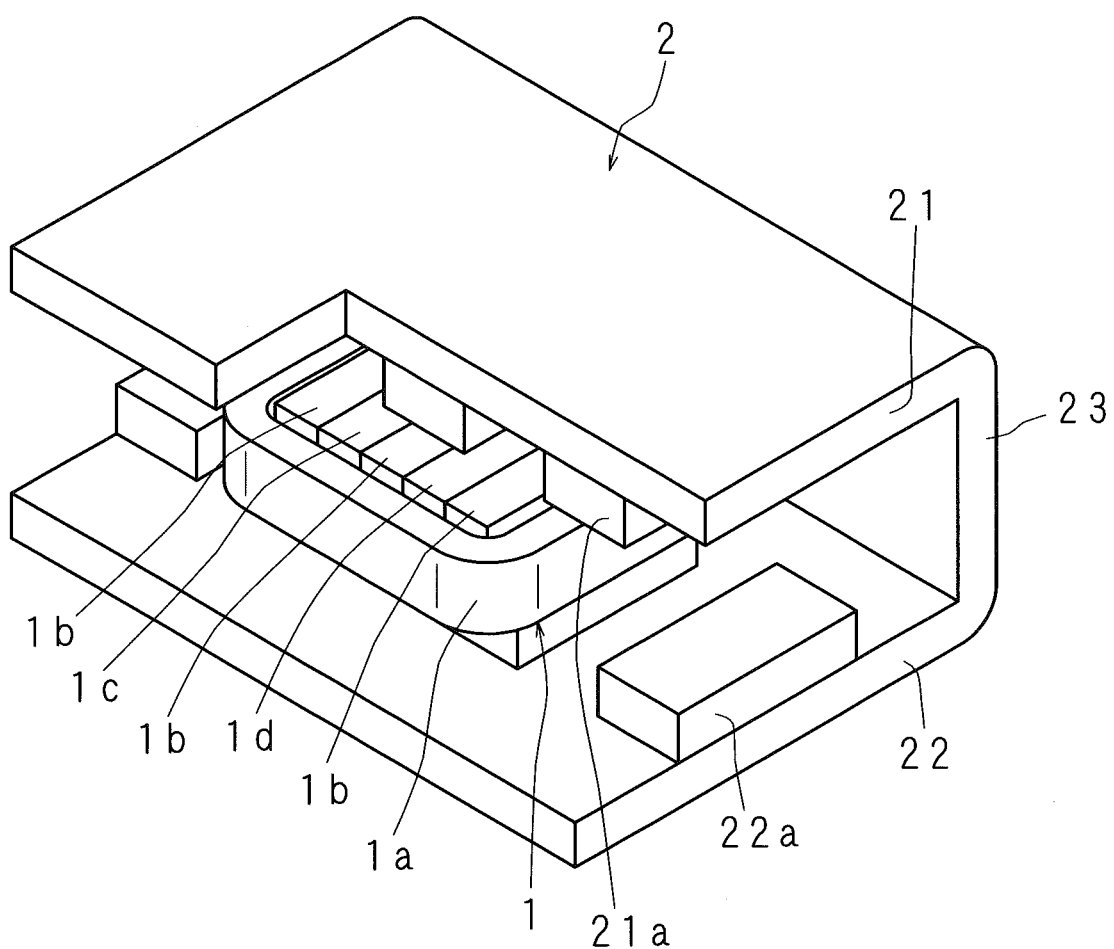
FIG. 1 is a partly cutaway perspective view illustrating an example of outline configuration of a linear motor according to Embodiment 1.
Figure 2:
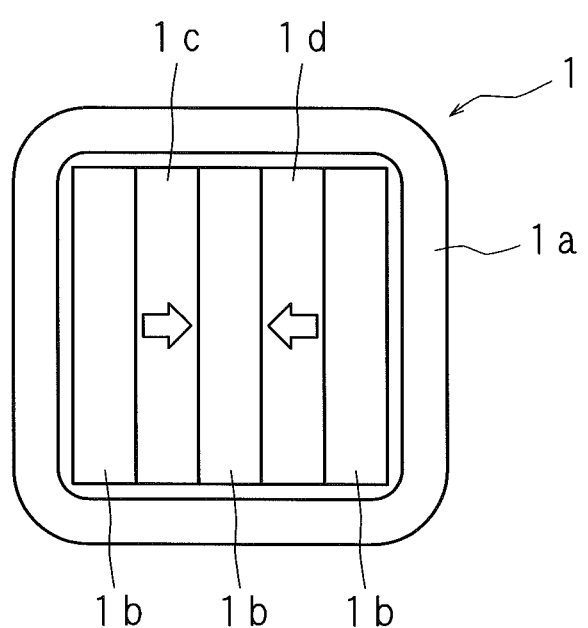
FIG. 2 is a plan view illustrating an exemplary configuration of a movable element of a linear motor according to Embodiment 1.
Figure 3:
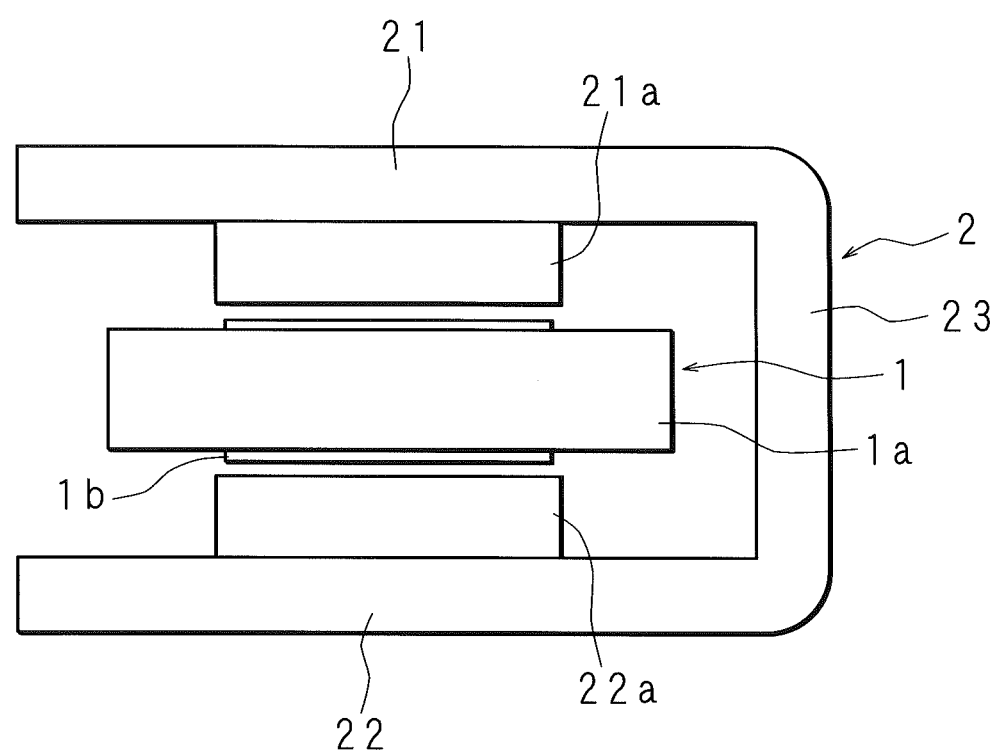
FIG. 3 is a sectional view illustrating an outline configuration of a linear motor according to Embodiment 1.
Figure 4:
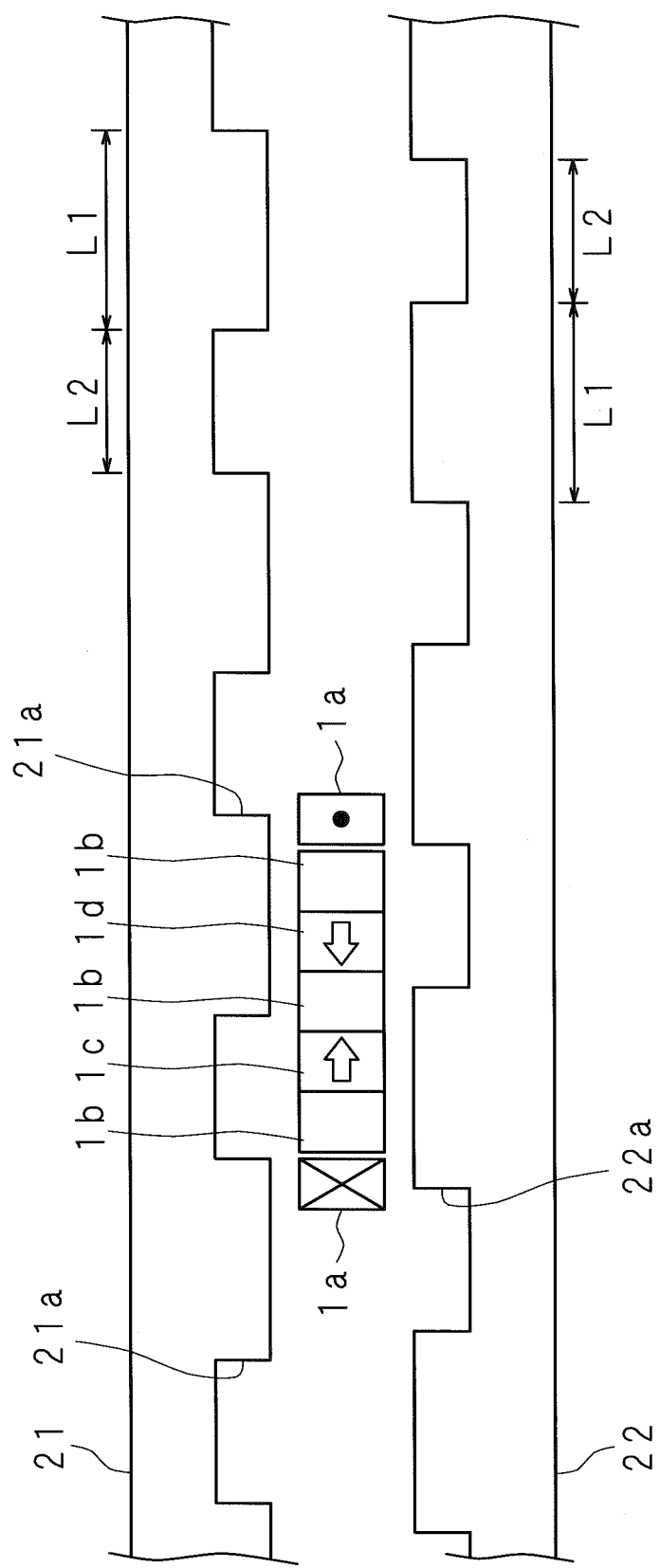
FIG. 4 is a side view illustrating an outline configuration of a linear motor according to Embodiment 1.

FIG. 1 is a partly cutaway perspective view illustrating an example of outline configuration of a linear motor according to Embodiment 1. FIG. 2 is a plan view illustrating an exemplary configuration of a movable element 1 of the linear motor according to Embodiment 1. FIG. 3 is a sectional view illustrating an outline configuration of the linear motor according to Embodiment 1. FIG. 4 is a side view illustrating an outline configuration of the linear motor according to Embodiment 1.

The linear motor according to the present embodiment includes a movable element 1 and a stator 2. The movable element 1 is constructed such that an armature yoke (a yoke) 1b and permanent magnets (magnets) 1c and 1d each having a substantially rectangular parallelepiped shape are aligned and linked and then a coil 1a is wound therearound. In the present embodiment, the movable element 1 employs a compact configuration constructed from three armature yokes 1b, one permanent magnet 1c, and one permanent magnet 1d. As illustrated in FIG. 1 or 2, the armature yoke 1b, the permanent magnet 1c, the armature yoke 1b, the permanent magnet 1d, and arranged in order of the armature yoke 1b. That is, the armature yoke 1b and the permanent magnet 1c or 1d, are alternately arranged along the moving direction of the movable element 1. The permanent magnet 1c and the permanent magnet 1d are arranged such that the armature yoke 1b is located in between. An outlined arrow illustrated in each of the permanent magnets 1c and 1d in FIGS. 2 and 4 indicates the magnetization direction of each of the permanent magnets 1c and 1d. The end point of the outlined arrow indicates an N-pole and the starting point indicates an S-pole. The permanent magnet 1c and the permanent magnet 1d are magnetized along the moving direction of the movable element 1 and the magnetization directions are opposite to each other. The coil 1a surrounds the armature yoke 1b and the permanent magnet 1c or 1d arranged as described above.

As illustrated in FIG. 3, the stator 2 has a cross section of substantial U-shape. The stator 2 includes two plate-shaped parts consisting of an upper plate part 21 and a lower plate part 22. In the upper plate part 21 and the lower plate part 22, the plate surfaces face each other in such a manner that the movement domain of the movable element 1 is located in between. A side plate part 23 having a plate shape links the upper plate part 21 to the lower plate part 22. As illustrated in FIG. 1, the stator 2 is elongated in the moving direction of the movable element 1. The upper plate part 21 includes a plurality of tooth parts 21a provided on one surface facing the lower plate part 22. The tooth parts 21a are aligned on the upper plate part 21 along the moving direction of the movable element 1. The lower plate part 22 includes a plurality of tooth parts 22a provided on one surface facing the upper plate part 21. The tooth parts 22a are aligned on the lower plate part 22 along the moving direction of the movable element 1. Each of the tooth parts 21a and the tooth parts 22a has a substantially rectangular parallelepiped shape. The stator 2 is formed by bending a soft magnetic metal such as a flat-plate shaped rolled steel. Instead of formation by bending, the stator 2 may be formed by fixing a flat-plate shaped rolled steel by joining such as welding, by screwing, or by other methods. The upper plate part 21 and the lower plate part 22 of the stator 2 are magnetically linked by the side plate part 23. Each of the tooth parts 21a and the tooth parts 22a also is formed into a rectangular parallelepiped shape by stacking soft magnetic metal plates such as steel plates. The tooth parts 21a and the tooth parts 22a formed in rectangular parallelepiped shapes are individually fixed to the upper plate part 21 and the lower plate part 22 by joining such as welding, by screwing, or by other methods.

Alternatively, in a state that portions constituting tooth parts are preserved in a magnetic steel plate formed in a substantial U-shape, grooves may be formed on both sides of each portion constituting the tooth part by digging process so that the tooth parts 21a and the tooth parts 22a may be formed. This permits cost reduction in the stator 2 in comparison with a case that the tooth parts are fixed by joining such as welding, by screwing, or by other methods. Further, in the plate-shaped member, slits may be formed in a state that portions constituting the tooth parts 21a and the tooth parts 22a remain. Alternatively, the portions constituting the tooth parts 21a and the tooth parts 22a may be formed in the shape of comb teeth. Here, it is not indispensable that the stator 2 is installed in the orientation illustrated in FIG. 3. Any orientation may be employed as long as the stator 2 may be installed. The installation may be such that the upper plate part 21 is located on the lower side or on the left or right side.

As illustrated in FIGS. 3 and 4, it is preferable that the tooth parts 21a and the tooth parts 22a have an identical shape and an identical size. The ratio of the length L1 of the tooth part 21a (the tooth part 22a) along the moving direction of the movable element 1 and the interval L2 between two tooth parts 21a (tooth parts 22a) is set to be 6:4. That is, the width L1 in the alignment direction of the tooth parts 21a (the tooth parts 22a) is longer than the alignment interval L2 of the tooth parts 21a (22a). The linear motor according to the present embodiment has a compact configuration that three armature yokes 1b are provided in the movable element 1.

It is preferable that the lengths of the armature yokes 1b and the permanent magnets 1c and 1d in a direction perpendicular to the moving direction of the movable element 1 (the lengths in a direction perpendicular to the page of FIG. 2 or the lengths in the up and down directions within the page of FIG. 3; the lengths in the normal line direction relative to the plate surfaces of the upper plate part 21 and the lower plate part 22, provided in the stator 2 facing each other) are substantially the same. Here, when the armature yoke 1b is longer than the permanent magnets 1c and 1d, the magnetic flux of the armature yoke 1b in a portion protruding from the permanent magnets 1c and 1d does not flow in the normal line direction of the plate surface of the upper plate part 21 or the lower plate part 22 and leaks in a horizontal direction. As a result, the magnetic flux amount flowing to the tooth part 21a or 22a of the stator from the armature yoke 1b decreases so that the thrust force decreases.

Further, when the permanent magnets 1c and 1d are longer than the armature core 1b, the magnetic flux component which is in the normal line direction of the plate surface of the upper plate part 21 or the lower plate part 22 and contributes to the thrust force becomes difficult to be ensured. This causes a thrust force loss. As described later, the thrust force in the present invention depends on the magnetic flux amount flowing between the armature yoke 1b and the tooth part 21a and between the armature yoke 1b and the tooth part 22a. Thus, when the permanent magnets 1c and 1d protrude, the distance between the tooth part 21a and the armature yoke 1b and the distance between the tooth part 22a and the armature yoke 1b become distant and hence the thrust force decreases. Here, the expression "substantially the same" indicates that the size settings are the same in the design of the structure part. Then, since machining errors caused by machining equipment is contained, such tolerances are included in the design size setting so that the expression "substantially the same" is employed.

Figure 5:
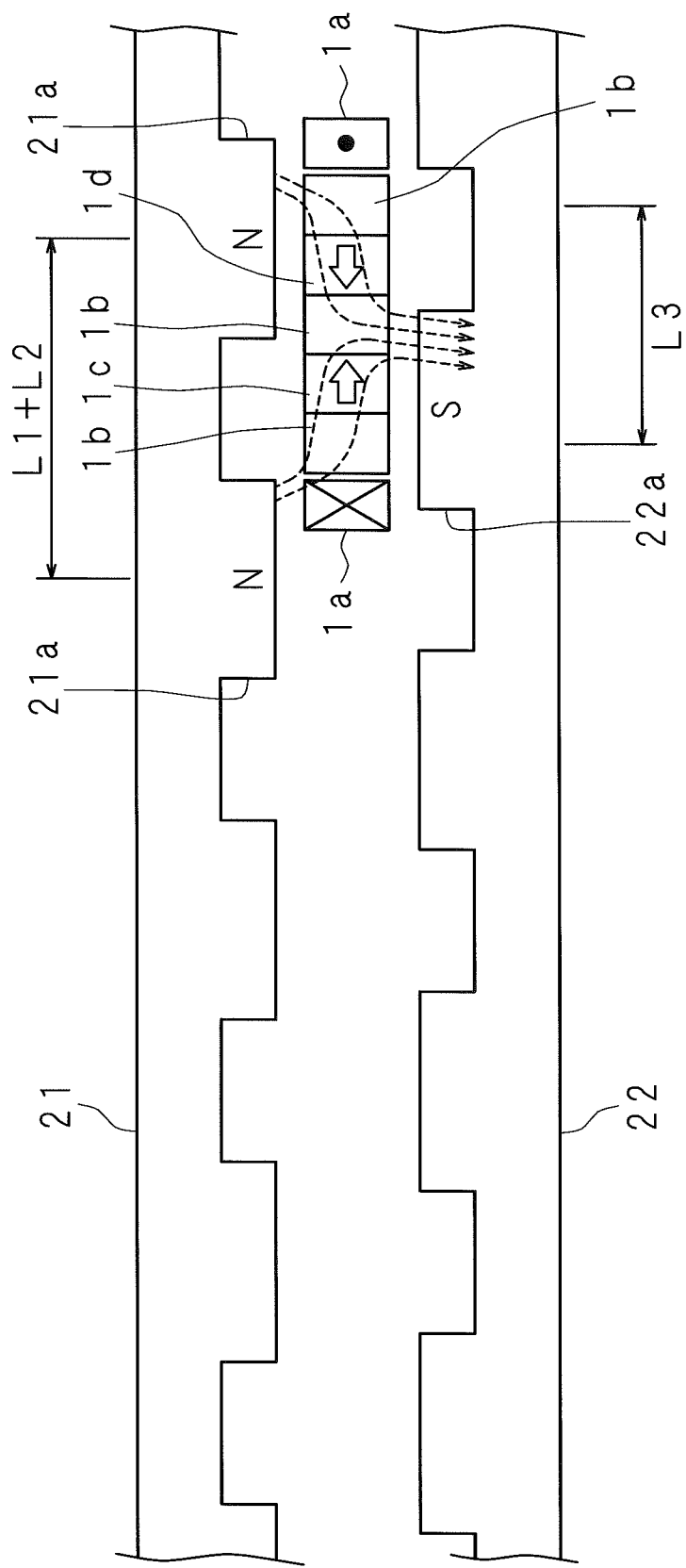
FIG. 5 is a diagram used for illustrating a principle of thrust force generation in a linear motor according to Embodiment 1.
Figure 6:
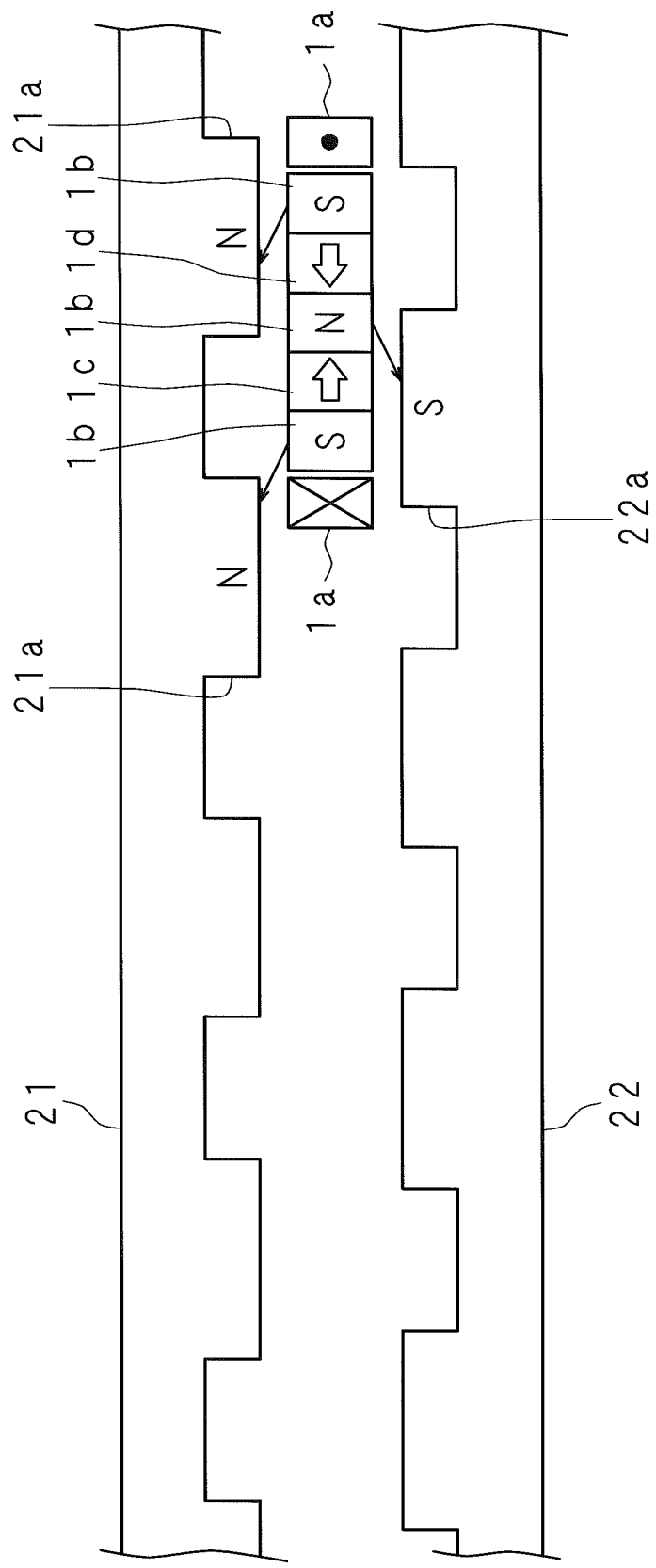
FIG. 6 is a diagram used for illustrating a principle of thrust force generation in a linear motor according to Embodiment 1.
Figure 7:
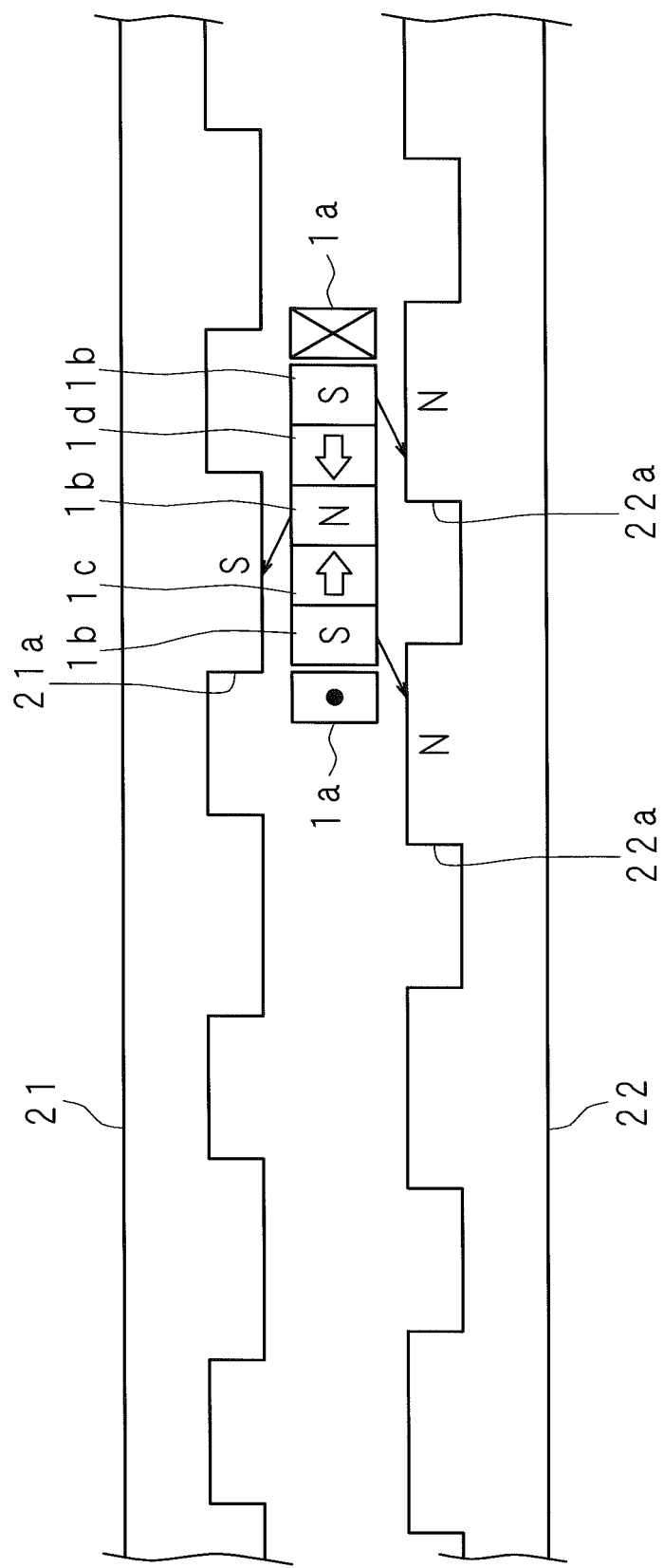
FIG. 7 is a diagram used for illustrating a principle of thrust force generation in a linear motor according to Embodiment 1.

FIGS. 5, 6, and 7 are diagrams used for illustrating a principle of thrust force generation in the linear motor according to Embodiment 1. The portion along the moving direction of the coil 1a of the movable element 1 is not illustrated for convenience of description and the cross section alone of the portion perpendicular to the moving direction is displayed. An alternating current is provided into the coil 1a of the movable element 1. A black dot illustrated in the coil 1a of FIGS. 5 and 6 indicates energization from the rear side toward the front side of the page and a cross indicates energization from the front side toward the rear side of the page. As a result of energization to the coil 1a (the direction of the electric current at a time point that the alternating current is provided is illustrated), a flow of magnetic flux indicated by dashed lines in FIG. 5 is generated.

When the number of the armature yokes 1b provided in the movable element 1 is three, as illustrated in FIG. 5, the magnetic flux flowing from the tooth parts 21a flows into the armature yokes 1b located at both ends of the movable element 1. The magnetic flux having flowed in goes through the inside of the permanent magnets 1c and 1d, then is collected into the armature yoke 1b located between the permanent magnets 1c and 1d, that is, located in the middle of the movable element 1, and then passes into the tooth part 22a. By virtue of this, the distance (L3) between the moving directional middle parts of the armature yokes 1b at both ends may be set smaller than the pitch (L1+L2) of the aligned tooth parts 21a. That is, the length in the moving direction of the movable element 1 may be made small. The pitch of the tooth parts 21a indicates the distance between the alignment directional middle parts of two adjacent tooth parts 21a and 21a. Also in the tooth parts 22a, the situation is similar to that of the tooth parts 21a.

In other words, the pitch of the tooth parts per one phase may be made relatively large.

In contrast, when the number of the armature yokes 1b provided in the movable element 1 is four or more, the interval between the moving directional middle parts of the individual armature yokes 1b is to be set to be ½ relative to the interval (the pitch) (L1+L2) between the moving directional middle parts of the aligned tooth parts 21a. In the case of FIG. 5, the configuration is to be L1+L2=L3/2+L3/2=L3. Thus, it becomes difficult to shorten the length in the moving direction of the movable element.

That is, when the number of the armature yokes 1b is four or more, the following problem arises. When the configuration is set to be L1+L2>L3, the interval between the adjacent armature yokes 1b becomes small. Since the directions of the magnetic fields of armature yokes 1b adjacent to each other with the permanent magnet 1c or 1d in between generated by the permanent magnets 1c and 1d are different from each other, attraction and repulsion occur relative to one tooth part 21a (22a) in a short distance. This reduces the thrust force generated between the movable element 1 and the stator 2.

The width in the moving direction of the movable element 1 except for the coil 1a is set smaller than a width (L1+L2) obtained by adding the width L1 of the tooth part 21a (22a) and the interval L2 between two tooth parts 21a (22a). In FIG. 3, The length in the right and left directions in the page of the tooth parts 21a and the tooth parts 22a is set slightly larger than the armature yokes 1b and the permanent magnets 1c and 1d. In this case, the air gap virtually becomes short by a fringing magnetic flux and hence the magnetic flux from the permanent magnets 1c and 1d of the movable element 1 may efficiently flow to the stator 2. Further, the length of the tooth parts 21a and 22a and the length of the armature yokes 1b and the permanent magnets 1c and 1d may be set as identical.

The tooth parts 21a and the tooth parts 22a are arranged at regular intervals (L2) individually on the facing surface sides of the upper plate part 21 and the lower plate part 22 facing each other in the stator 2. The longitudinal directions of the tooth parts 21a and the tooth parts 22a are arranged substantially at right angles to the moving direction of the movable element 1. Further, the tooth parts 21a and the tooth parts 22a are arranged alternately (in a staggered manner) along the moving direction of the movable element 1 on the surfaces facing each other in a manner that the moving directional middle parts of the movable element 1 do not overlap. Here, in the tooth parts 21a and the tooth parts 22a, when the surfaces facing each other overlap entirely, a thrust force is not generated in the movable element 1.

The above-described movable element 1 is arranged in the stator 2 having the above-described configuration. As illustrated in FIG. 4, one surface of the movable element 1 faces the tooth parts 21a and the other surface thereof faces the tooth parts 22a. Among the armature yokes 1b arranged in the front and the rear in the moving direction, one faces the tooth part 21a and the other faces the tooth part 22a. The middle armature yoke 1b faces both the tooth parts 21a and 22a. One tooth part 21a or 22a is provided per one magnetic cycle. The tooth part 21a and the tooth part 22a are provided at positions whose electrical angles are different by 180 degrees (positions deviated by ½ magnetic cycle).

Next, the principle of thrust force generation in the linear motor according to Embodiment 1 is described below with reference to FIGS. 5, 6 and 7. As described above, in FIG. 5, in the movable element 1, a flow of magnetic flux indicated by the dashed lines is generated. That is, the magnetic flux generated in the right and left armature yokes 1b goes through the permanent magnet 1c or 1d and then flows from the middle armature yoke 1b into the tooth part 22a. The magnetic flux having flowed into the tooth part 22a goes through the lower plate part 22, the side plate part 23, and the upper plate part 21 and then flows from the tooth part 21a into the right and left armature yokes 1b so that the above-described magnetic flux loop is generated. As a result of the magnetic flux loop, the tooth part 21a is magnetized into the N-pole and the tooth part 22a is magnetized into the S-pole.

Next, generation of the magnetic poles and generation of the thrust force by the permanent magnets 1c and 1d are described below with reference to FIG. 6. As illustrated in FIG. 6, in a case that the permanent magnets 1c and 1d are arranged such that the magnetization directions are opposite to each other relative to the armature yokes 1b, the entirety of each armature yoke 1b becomes a monopole. The middle armature yoke 1b is magnetized into an N-pole and the right and left armature yokes 1b are each magnetized into an S-pole.

On the other hand, the tooth part 21a of the stator 2 is magnetized into an N-pole and the tooth part 22a is magnetized into an S-pole. Attraction and repulsion occur between the magnetic poles generated in the tooth parts 21a and 22a and the magnetic poles magnetized in the armature yokes 1b by the permanent magnets 1c and 1d so that a thrust force in the leftward direction in the page of FIG. 6 is generated in the movable element 1.

FIG. 7 illustrates a state where the movable element 1 has advanced, from the state of FIG. 6, a distance corresponding to an electrical angle of 180 degrees. In FIG. 7, the direction of the electric current flowing through the coil 1a is reversed. As a result, the flow of magnetic flux going from the upper side to the lower side indicated by the dashed lines in the page of FIG. 5 becomes reverse. This situation is equivalent to that the tooth part 21a is magnetized into an S-pole and the tooth part 22a is magnetized into an N-pole. Magnetization of the armature yokes 1b by the permanent magnets 1c and 1d is not changed. Thus, the attraction/repulsion relationship of the tooth parts 21a and 22a becomes reverse in comparison with the case of FIG. 6. An attracting force occurs in the direction of an arrow illustrated in FIG. 7 and hence a thrust force in the leftward direction in the page of FIG. 7 is generated in the movable element 1. When, from the state of FIG. 7, the movable element 1 has advanced a distance corresponding to an electrical angle of 180 degrees, a state similar to FIG. 6 occurs. The above-described operation is repeated so that the movable element 1 continues moving.

Next, improvement in the influence of an edge effect is described below. The end effect indicates that in the linear motor, the influence of magnetic attracting and repulsive forces generated at both ends of the movable element affects the thrust force characteristics (the cogging characteristics and the detent characteristics) of the motor. In the conventional art, in order to reduce the edge effect, a countermeasure has been taken like the shapes of the tooth parts at both ends are made different from the shape of the others. The reason for the occurrence of the end effect is that the magnetic flux loop flows in the same direction as the moving direction (see FIG. 2 in Patent Document 1). However, in the linear motor according to Embodiment 1, the loop (the magnetic flux loop) containing the magnetic path going through the stator 2 flows in a direction at right angles to the moving direction and hence the influence of the end effect may be reduced.

As described above, in the linear motor according to

Embodiment 1, the permanent magnets 1c and 1d are employed only in the movable element 1. Thus, even when the overall length of the linear motor is made long, the amount of permanent magnets to be employed does not increase and is fixed. Accordingly, cost reduction may be achieved. In addition, the influence of the edge effect may be reduced.

Further, the movable element 1 has a compact configuration that the three armature yokes 1b and two permanent magnets consisting of the one permanent magnet 1c and the one permanent magnet 1d are employed. Thus, the width of the permanent magnets 1c and 1d in the moving direction of the movable element 1 may be made wide and the width of the tooth parts 21a and 22a in the moving direction of the movable element 1 may also be made large. Thus, by virtue of this, a larger thrust force may be obtained than in a stator of the same size provided with a larger number of armature yokes and permanent magnets.

Here, in Embodiment 1, a mode has been illustrated that the entirety of the movable element 1 is located between the upper plate part 21 and the lower plate part 22. However, in the present invention, in the movable element 1, it is sufficient that the permanent magnets 1c and 1d and the armature yokes 1b are located between the upper plate part 21 and the lower plate part 22 of the stator 2. That is, a part of the coil 1a may protrude from the stator 2.

Further, the armature yokes 1b and the permanent magnets 1c and 1d have rectangular parallelepiped shapes. However, employable configurations are not limited to this. It is sufficient that the magnetic flux generated by magnetization of the coil 1a constitutes a magnetic loop circuit in cooperation with the stator 2. For example, the armature yokes 1b and the permanent magnets 1c and 1d may have regular hexahedron shapes.

Embodiment 2

Figure 8:
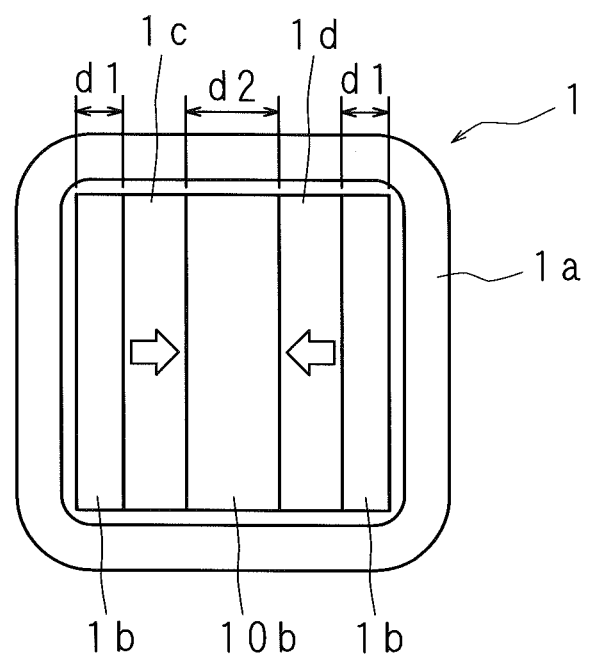
FIG. 8 is a plan view illustrating a movable element of a linear motor according to Embodiment 2.

FIG. 8 is a plan view illustrating a movable element 1 of a linear motor according to Embodiment 2. The stator 2 is similar to that of Embodiment 1 and hence the description thereof is not given below.

Embodiment 2 is characterized in that among the three armature yokes 1b and 10b aligned along the moving direction of the movable element 1, the armature yoke 10b located in the middle has a moving directional width different from that of the armature yokes 1b located at the right and left. The width d2 of the armature yoke 10b is set to be twice the width d1 of the armature yokes 1b. The purpose of this is to prevent magnetic saturation from easily occurring when the magnetic flux flowing through the armature yokes 1b and 10b increases in association with an increase in the coil current. The armature yokes 1b located at the right and left exchange the magnetic flux from the one permanent magnet 1c or 1d with the tooth part 21a or 22a. In contrast, the armature yoke 10b located in the middle exchanges the magnetic flux from the two permanent magnets 1c and 1d with the tooth part 21a or 22a. Thus, it is preferable that the width d2 of the armature yoke 10b located in the middle is set to be twice the width d1 of the armature yokes 1b located in the right and left.

Figure 9A:
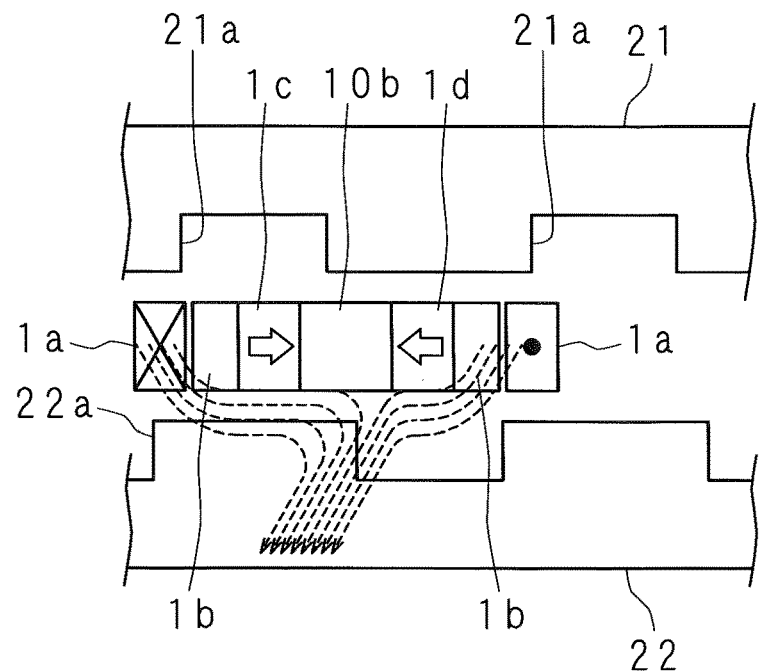
FIG. 9A is an explanation diagram concerning magnetic saturation in armature yokes of a movable element.
Figure 9B:
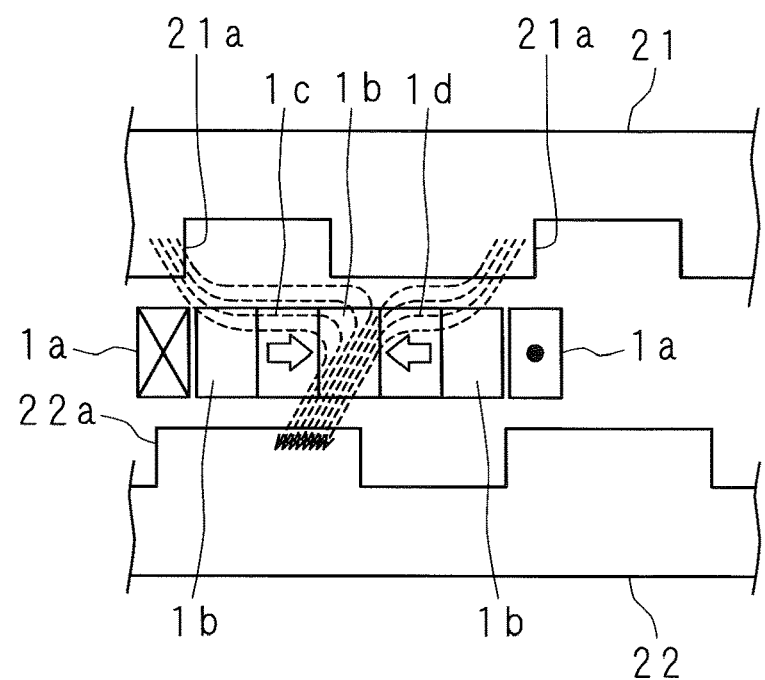
FIG. 9B is an explanation diagram concerning magnetic saturation in armature yokes of a movable element.

FIGS. 9A and 9B are explanation diagrams concerning magnetic saturation in the armature yokes 1b and 10b of the movable element 1. FIG. 9A illustrates the case of the movable element 1 according to the present embodiment. FIG. 9B illustrates the case of the movable element 1 according to Embodiment 1 described above. The dashed lines going from the tooth part 21a, through the armature yoke 1b and the permanent magnet 1c or 1d, through the armature yoke 1b or 10b, and then reaching the tooth part 22a indicate the flow of magnetic flux. In the present embodiment, the armature yoke located between the two permanent magnets 1c and 1d, that is, the armature yoke 10b located in the middle, has a larger width (length) in the moving direction than the armature yoke 1b in Embodiment 1. Thus, the density of the magnetic flux flowing to the tooth parts 22a is difficult to become high and hence magnetic saturation is difficult to occur. As such, even when the electric current of the coil 1a is increased, magnetic saturation is difficult to occur in the armature yoke 10b. Thus, the thrust force linearity at the time of increase in the electric current of the linear motor is improved. Here, the flow of magnetic flux in FIG. 9 is illustrated merely as an example.

Here, the width d2 is not limited to twice the width d1. When the width d2 is greater than or equal to the twice, the armature yoke 10b becomes difficult to be saturated. However, even when magnetic saturation does not occur in the armature yoke 10b, saturation occurs in the armature yokes 1b at both ends. Thus, it is preferable that the width d2 is equal to twice the width d1. When the width d2 is smaller than or equal to the twice, magnetic saturation becomes difficult to occur in the armature yoke 10b in comparison with a case that the width d2 is equal to the width d1. However, before magnetic saturation occurs in the armature yokes 1b at both ends, magnetic saturation occurs in the armature yoke 10b. The dimension in the moving direction of the movable element 1 is determined by the widths d1 and d2. Thus, it is sufficient that setting of the values for the widths d1 and d2 is determined with taking into consideration the points described above.

Figure 10:
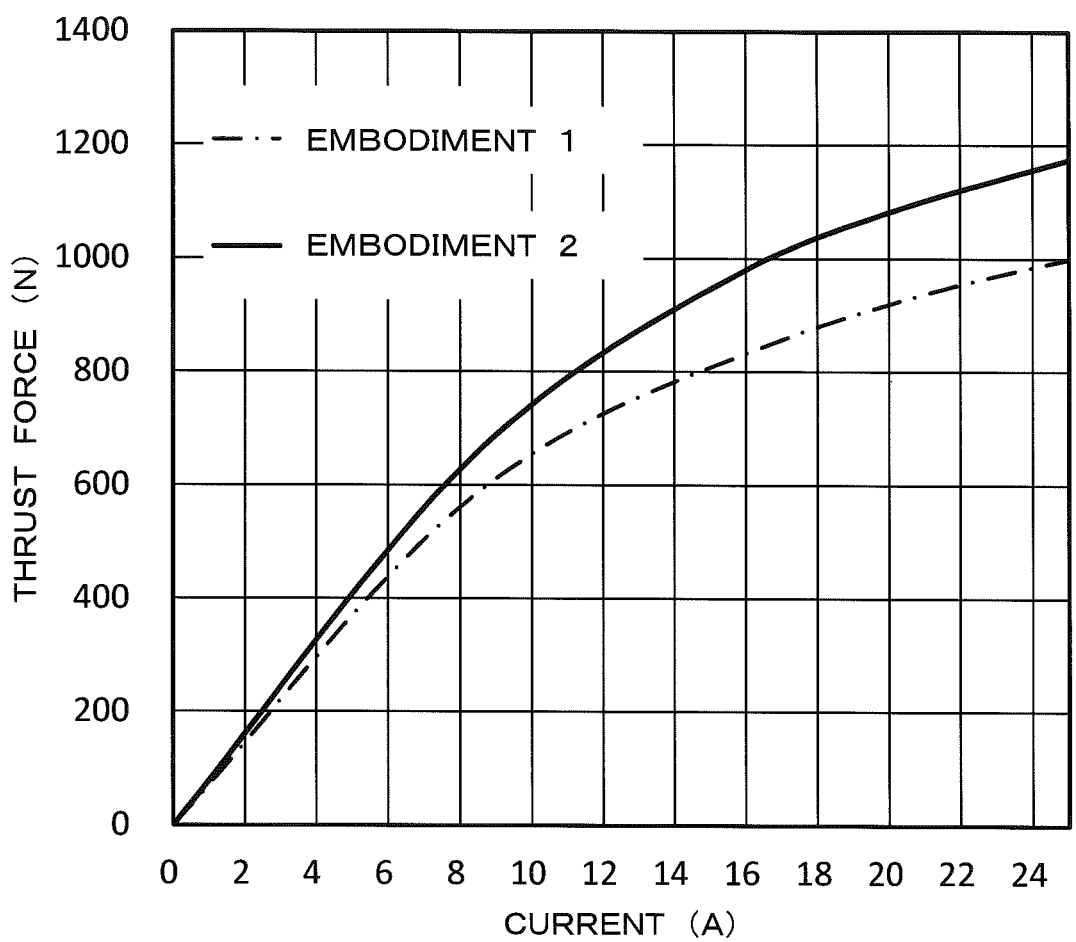
FIG. 10 is a graph diagram illustrating a relation between an electric current flowing through a coil and an obtained thrust force in each linear motor according to Embodiments 1 and 2.

FIG. 10 is a graph diagram illustrating the relation between the electric current flowing through the coil 1a and the obtained thrust force in each linear motor according to Embodiments 1 and 2. The horizontal axis indicates the electric current in the unit of ampere (A). The vertical axis indicates the thrust force in the unit of Newton (N). As illustrated in FIG. 10, the linear motor according to the present embodiment (Embodiment 2) has a more satisfactory thrust force linearity than the linear motor according to Embodiment 1.

As described above, in addition to the effects provided by the linear motor according to Embodiment 1, the linear motor according to Embodiment 2 provides the following effects. Since the width d2 of the armature yoke 10b located in the middle has been set to be twice the width d1 of the armature yokes 1b located at the right and left, in a state that the length in the moving direction of the movable element 1 is made small, magnetic saturation in the armature yokes 1b and 10b may be alleviated and a large thrust force may be obtained. That is, a linear motor may be obtained in which two items consisting of size reduction of the movable element 1 and enhancement of the thrust force which are in the relation of trade-off are made satisfactory. This provides an effect that a more satisfactory linearity at the time of increase in the electric current is obtained.

Embodiment 3

Embodiments 1 and 2 have been described for a single-phase linear motor (a unit for a single phase). However, employable configurations are limited to this. For example, when a linear motor of three-phase drive is to be constructed, it is sufficient that the pitch between three individual movable elements is set to be n times ⅔ (an integral multiple of ⅔) of the pitch of the stator tooth parts. Further, in this case, it is sufficient that the integer n is set with taking into consideration the length in the longitudinal direction of each movable element.

Figure 11:
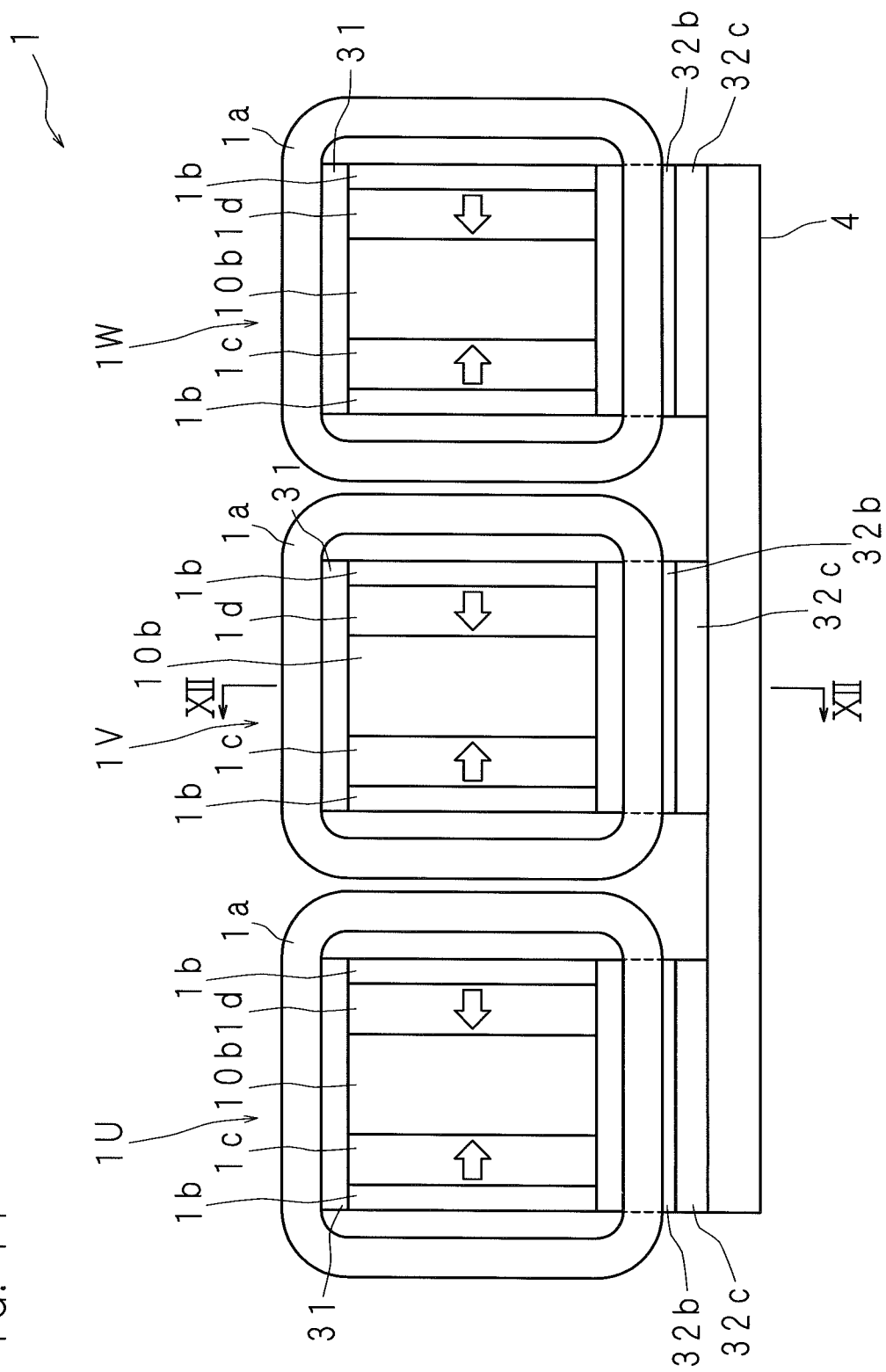
FIG. 11 is a plan view illustrating an exemplary configuration of a movable element of a linear motor according to Embodiment 3.
Figure 12:
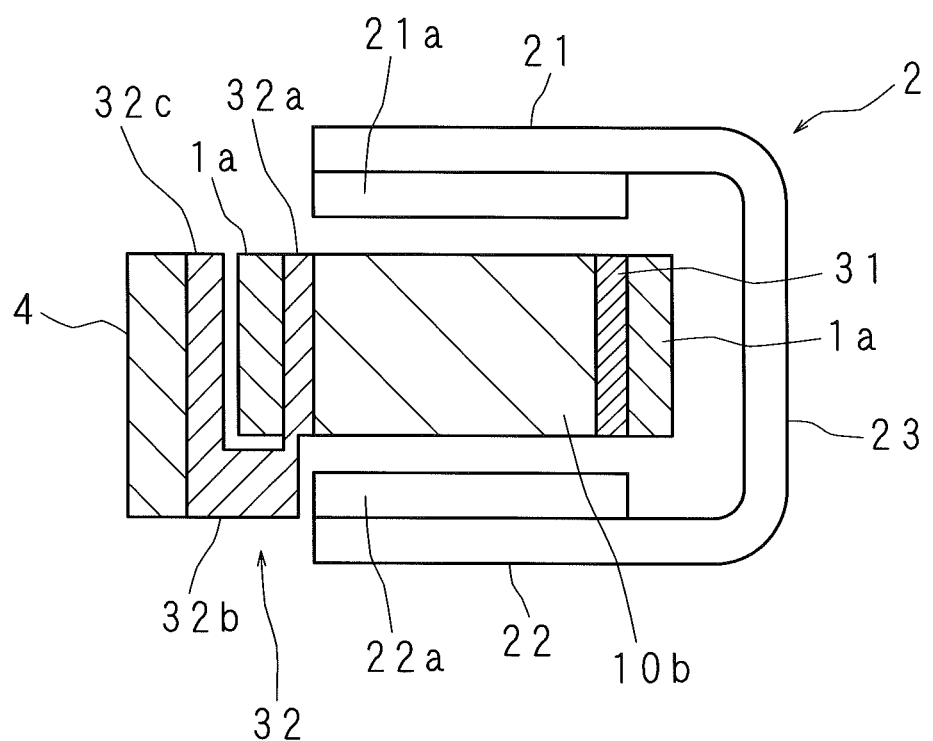
FIG. 12 is a sectional view illustrating a cross section taken along cross sectional line XII-XII in FIG. 11 and a cross section of a stator.

FIG. 11 is a plan view illustrating an exemplary configuration of a movable element 1 of the linear motor according to Embodiment 3. FIG. 12 is a sectional view illustrating a cross section taken along cross sectional line XII-XII in FIG. 11 and a cross section of a stator 2. In FIG. 12, in order to illustrate the positional relation between the stator 2 and the movable element 1, the cross section of the stator 2 not illustrated in FIG. 11 is illustrated. The linear motor according to the present embodiment is a three-phase motor. The movable element 1 is constructed such that three single-phase units 1U, 1V and 1W each similar to the movable element 1 in Embodiment 2 are arranged along the moving direction. A single-phase unit corresponding to U-phase is 1U, a single-phase unit corresponding to V-phase is 1V, and a single-phase unit corresponding to W-phase is 1W. Each of the three single-phase units 1U, 1V and 1W has the same configuration. In each configuration, like components to those illustrated in FIG. 8 are designated by like numerals employed in FIG. 8. When the movable element 1 is compared with each of the single-phase units 1U, 1V and 1W illustrated in FIG. 8, each of the single-phase units 1U, 1V and 1W includes an auxiliary plate 31 and an output part 32. The auxiliary plate 31 has a rectangular plate shape. The auxiliary plate 31 is constructed from a non-magnetic and electrically non-conductive material such as engineering plastics (polyamide or polycarbonate) and non-magnetic ceramics. When the auxiliary plate 31 is formed from a non-magnetic and electrically non-conductive material, the passage of an eddy current flowing through the armature yokes 1b and 10b may be partly cut off. Thus, the eddy current loss may be made small and hence the output efficiency is improved. The auxiliary plate 31 is arranged in a vertical attitude between the coil 1a and a side surface (a side surface parallel to the moving direction) close to the side plate part 23 in the transverse direction of the armature yokes 1b and 10b and the permanent magnets 1c and 1d. The auxiliary plate 31 is in close contact with the side surface in the transverse direction of the armature yokes 1b and 10b and the permanent magnets 1c and 1d. The output part 32 (a non-magnetic material plate) has a vertical cross section of U-shape and includes a first protruding plate part 32a, a base part 32b and a second protruding plate part 32c. The output part 32 is constructed from a non-magnetic material such as aluminum and non-magnetic stainless steel, for example.

When the non-magnetic material is employed, occurrence of a short circuit in the magnetic flux generated in the movable element 1 may be prevented.

Each of the first protruding plate part 32a and the second protruding plate part 32c has a rectangular plate shape. The first protruding plate part 32a and the second protruding plate part 32c protrude substantially in a perpendicular direction from the base part 32b having a rectangular plate shape. The first protruding plate part 32a and the second protruding plate part 32c face each other with the winding of the coil 1a in between. The first protruding plate part 32a is arranged between the winding of the coil 1a and a side surface (a side surface parallel to the moving direction) in the transverse direction of the armature yokes 1b and 10b and the permanent magnets 1c and 1d. The length of the longitudinal direction of the base part 32b is substantially equal to a value obtained by adding up the lengths in the transverse direction of the armature yokes 1b and 10b and the permanent magnets 1c and 1d. The first protruding plate part 32a is in close contact with a surface facing the side surface being in close contact with the auxiliary plate 31 among the side surfaces in the transverse direction of the armature yokes 1b and 10b and the permanent magnets 1c and 1d. The auxiliary plate 31 and the first protruding plate part 32a avoids a situation that the armature yokes 1b and 10b and the permanent magnets 1c and 1d deviate from each other. The movable element 1 includes a linkage plate 4 (a linkage part) elongated in the moving direction. The individual single-phase units are linked by fixing the linkage plate 4 to the second protruding plate parts 32c provided in the individual single-phase units with screws or the like.

Supporting of the movable element 1 is performed in a movable manner by the first protruding plate part 32a composed of a non-magnetic material via the base part 32b and the second protruding plate part 32c.

The first protruding plate part 32a is located between the armature yokes 1b, 10b and the coil 1a. Thus, size reduction of the movable element 1 may be achieved, for example, in comparison with a case that the side surface of the coil 1a is supported so that the movable element 1 is supported.

The electric current flowing through the coils 1a of the three single-phase units is a three-phase alternating current (a symmetrical three-phase alternating current). Similarly to FIG. 8, an outlined arrow illustrated in FIGS. 13 indicates the magnetization direction of each of the permanent magnets 1c and 1d. In Embodiment 3, The stator 2 is similar to those in Embodiments 1 and 2 and hence the description thereof is not given below.

Figure 13:
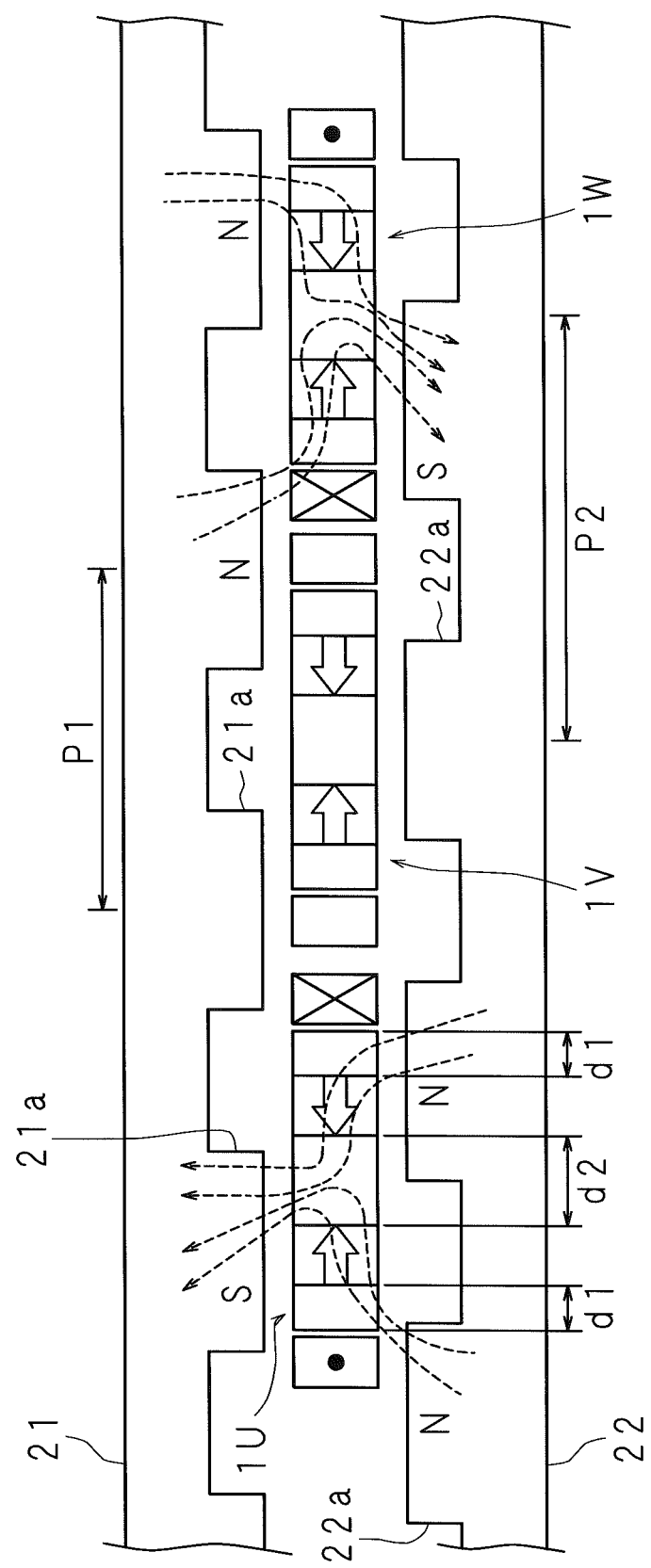
FIG. 13 is a diagram used for illustrating operation of a linear motor according to Embodiment 3.

FIG. 13 is a diagram used for illustrating the operation of the linear motor according to Embodiment 3. FIG. 13 illustrates the linear motor viewed from the side surface. The coil wires of the coil 1a extending in the right and left directions in the page of FIG. 13 are not illustrated for the purpose of description. As illustrated in FIG. 13, the moving-element phase pitch P2 is set to be a value equal to ⅔×2 times the pitch P1 (2 times ⅔ of P1) of the tooth parts 21a (22a). The state illustrated in FIG. 13 is such that electric currents flow through the coils 1a of U-phase and W-phase and no electric current flows through the coil 1a of V-phase. At that time, the principle of generation of a thrust force by the movable element 1W of W-phase is similar to the case of FIG. 5. The principle of generation of a thrust force by the movable element 1U of U-phase is similar to the case of FIG. 7.

The alternating current flowing through the coils 1a of U-phase, V-phase, and W-phase is a three-phase alternating current. Thus, next to V-phase, a situation is realized that no electric current flows through W-phase. After that, a situation is realized that no electric current flows through U-phase and then a situation is realized again that no electric current flows through V-phase as illustrated in FIG. 13. This operation is repeated so that the movable element 1 continues moving.

Figure 14:
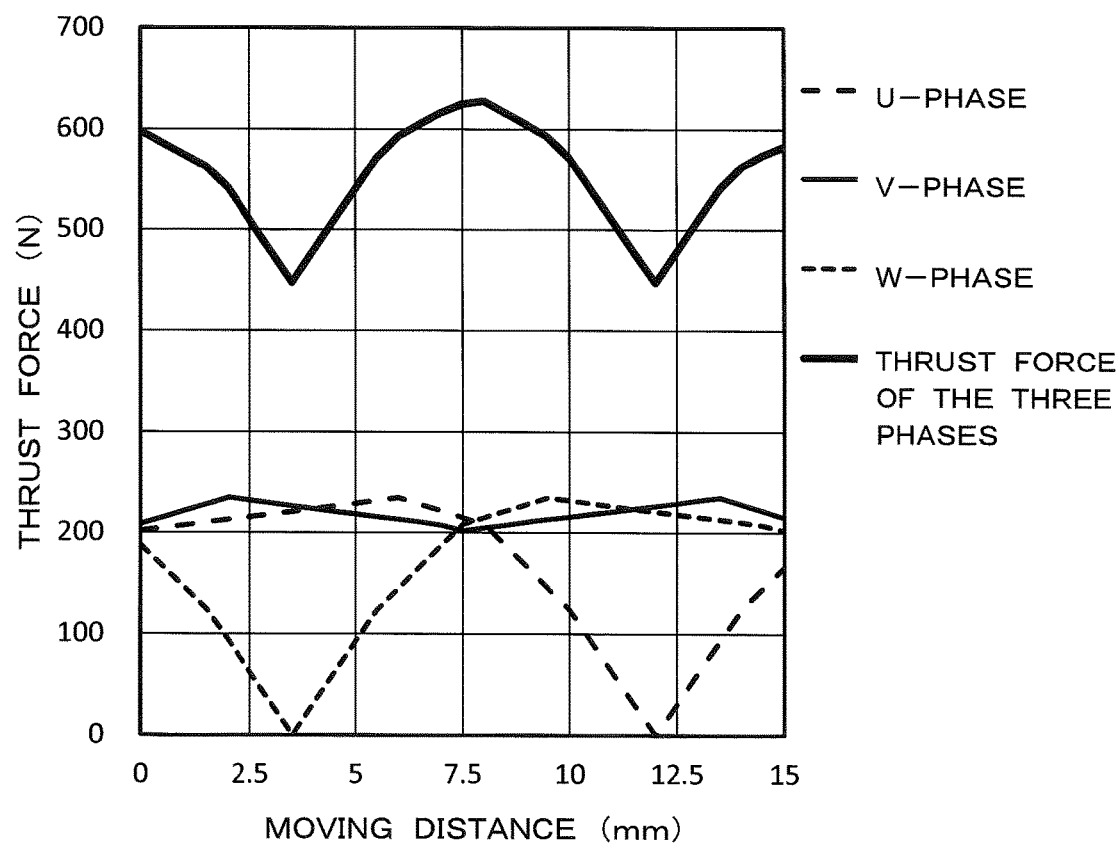
FIG. 14 is a graph illustrating a thrust force of a linear motor according to Embodiment 3.

FIG. 14 is a graph illustrating the thrust force of the linear motor according to Embodiment 3.

The horizontal axis indicates the moving distance of the movable element 1 in the unit of millimeter (mm).

The vertical axis indicates the thrust force in the unit of Newton (N). As illustrated in FIG. 14, the resultant thrust force of the three phases is approximately 2.5 times the single-phase peak thrust force. In general, the thrust force waveform per single phase is set to be a substantially sine wave shape and then the thrust force waveform after three-phase composition is smoothened so that thrust force pulsation is removed. However, in this case, the three-phase composition thrust force does not exceed approximately 1.4 times the single-phase peak thrust force. In contrast, in the linear motor of the present embodiment, the ratio between the length L1 of the tooth part 21a (the tooth part 22a) along the moving direction of the movable element 1 illustrated in FIGS. 3 and 4 and the interval L2 between two tooth parts 21a (tooth parts 22a) is set to be 6:4. Thus, the distribution of the thrust force waveform at the time that the relative position of the movable element 1 has varied relative to the stator 2 varies from a sine wave shape to a trapezoidal wave shape. As a result, although thrust force pulsation becomes large, the three-phase composition thrust force may be remarkably improved. That is, coexistence of size reduction and thrust force enhancement of the linear motor may be achieved.

Here, the resultant thrust force periodically fluctuates depending on the moving distance. However, it is sufficient that appropriate feedback is performed by PID (Proportional Integral Derivative) control so that the electric current is controlled such that the fluctuation width becomes small.

In the present embodiment, in addition to the effects in the linear motor according to Embodiment 1 or 2, the following effects are obtained. Since the auxiliary plate 31 formed from an electrically non-conductive material has been provided between the armature yokes 1b, 10b and the coil 1, the passage of eddy current flowing through the armature yokes 1b and 10b may be partly cut off. Thus, the eddy current loss may be reduced. Since three single-phase units have been linked into the movable element 1, a large thrust force may be obtained in comparison with a case of one single-phase unit.

Since the second protruding plate part 32c is provided, the thrust force of the linear motor may be easily transmitted to the outside.

In the present embodiment, the second protruding plate parts 32c provided in the individual single-phase units 1U, 1V and 1W have been fixed to the linkage plate 4 with screws or the like so that the single-phase units have been linked together. However, employable configurations are not limited to this. A configuration may be employed that the linkage plate 4 is not provided. That is, when the second protruding plate parts 32c of the individual single-phase units are formed in an integrated manner, the linkage plate 4 may be eliminated.

As illustrated in FIG. 12, the output part 32 is constructed to have a cross section of U-shape. However, such a configuration may be employed that the base part 32b is located at an upper position, that is, the cross section has an inverted U-shape.

The configuration that the auxiliary plate 31 is provided between the coil 1a and the side surface in the transverse direction of the armature yokes 1b, 10b as well as the permanent magnets 1c, 1d may be applied also in Embodiments 1 and 2 described above.

Embodiment 4

When the permanent magnets 1c, 1d and the armature yokes 1b are arranged in the movable element 1, the specific magnetic permeability varies periodically in the moving direction. Thus, high-order detent force harmonic components remarkably appear. In general, in the drive of an independent phase type, the fundamental wave and the second- and fourth-order harmonics cancel out at the time of three-phase composition. However, the multiple-of-3-th order harmonics such as the third-, sixth-, ninth-, twelfth-order harmonics intensify each other.

Figure 15:
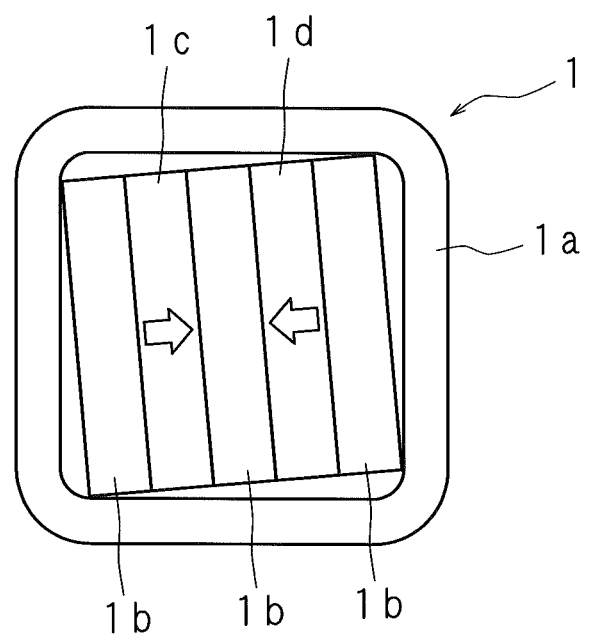
FIG. 15 is a plan view illustrating an exemplary configuration of a movable element of a linear motor according to Embodiment 4.

FIG. 15 is a plan view illustrating an exemplary configuration of a movable element 1 of the linear motor according to Embodiment 4. The surface on the moving direction side of the permanent magnets 1c and 1d and the armature yokes 1b is inclined in a direction intersecting with the moving direction and with the facing direction of the upper plate part and the lower plate part. That is, a so-called skew arrangement is employed. The skew arrangement indicates that the longer sides of the permanent magnets 1c, 1d and the armature yokes 1b are arranged with an inclination (an angle) relative to a direction perpendicular to the moving direction. That is, the longitudinal-directional both end parts of the permanent magnets 1c, 1d and the armature yokes 1b have different positions in the moving direction. By virtue of this, the twelfth or higher harmonic components may be reduced. Here, the angle of skew (the skew angle) is approximately 0 to 6 degrees. The stator 2 is similar to that of Embodiment 1 and hence the description thereof is not given below.

As described above, in addition to the effects provided by the linear motor according to Embodiment 1, the linear motor according to Embodiment 4 provides an effect that harmonic components of the detent force are reduced.

Further, the armature yokes 1b, the permanent magnets 1c and 1d having rectangular parallelepiped shapes are arranged. However, a configuration may be employed that the two surfaces of the individual armature yokes 1b, the individual permanent magnets 1c and 1d facing the inner peripheral surface of the coil 1a become parallel to the inner peripheral surface of the coil 1a. That is, one cross section of the armature yokes 1b, the permanent magnets 1c and 1d may have a parallelogram shape.

Also in Embodiment 2 or 3, when the permanent magnets 1c, 1d, the armature yokes 1b and 10b are in a skew arrangement, the twelfth or higher harmonic components are allowed to be reduced.

Embodiment 5

Figure 16:
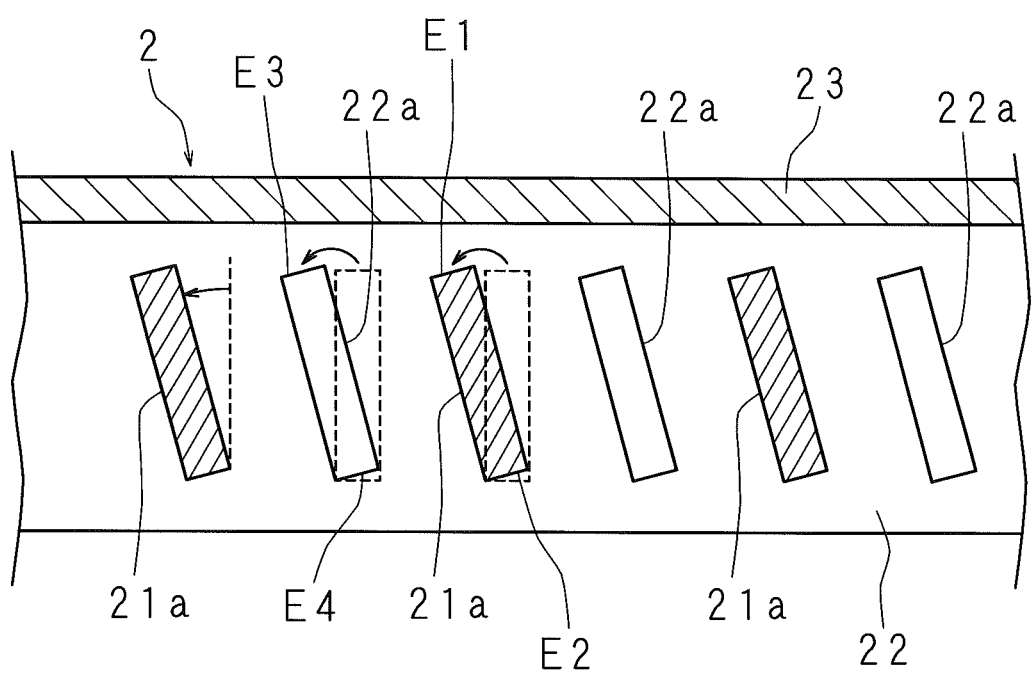
FIG. 16 is a sectional view illustrating a configuration of a stator of a linear motor according to Embodiment 5.

FIG. 16 is a sectional view illustrating the configuration of a stator 2 of a linear motor according to Embodiment 5. FIG. 16 is a transverse sectional view obtained by sectioning the stator 2 of the linear motor along the moving direction of the movable element 1. Shorter sides (any two sides) among two sets of two sides facing each other in the cross section of the tooth parts 21a and 22a parallel to the upper plate part 21 or the lower plate part 22 are inclined relative to the moving direction of the movable element 1. The tooth parts 21a provided in the upper plate part 21 and the tooth parts 22a provided in the lower plate part 22 are in a so-called skew arrangement. The following description is given for the third tooth part 21a from the left of FIG. 16. The cross section of the tooth part 21a is rectangular. The rectangles indicated by dashed lines illustrate a case that the tooth parts 21a are not in a skew arrangement. In FIG. 16, the moving direction of the movable element 1 is in the right or left direction. When a skew arrangement is not employed, the cross sectional shorter sides of the tooth part 21a indicated by dashed lines are parallel to the moving direction of the movable element 1. When a skew arrangement is employed, the cross sectional shorter sides E1 and E2 is inclined relative to the moving direction of the movable element 1. In FIG. 16, as for the tooth part 22a, the end surface at the tip in the protrusion direction is seen. In the second tooth part 22a from the left of FIG. 16, the rectangle indicated by dashed lines illustrate a case that the tooth parts 22a are not in a skew arrangement. The shorter sides of the end surface are parallel to the moving direction of the movable element 1, that is, not inclined. When a skew arrangement is employed, the shorter sides E3 and E4 of the cross section are inclined relative to the moving direction of the movable element 1. The cross section of the tooth part 22a has the same shape as the end surface. Thus, similarly, the cross sectional shorter sides are inclined relative to the moving direction of the movable element 1.

The movable element 1 is similar to any one of Embodiments 1 to 4 given above and hence the description thereof is not given below. In Embodiment 5, since the tooth parts 21a and the tooth parts 22a of the stator 2 are in a skew arrangement, the twelfth or higher harmonic components of the detent force are allowed to be reduced even when the armature yokes 1b (10b) and the permanent magnets 1c and 1d of the movable element 1 are not skewed. Here, when the movable element 1 similar to that of Embodiment 4 described above is employed, reduction of the detent force depends on the angles formed by the tooth parts 21a and 22a of the stator 2 as well as the armature yokes 1b and the permanent magnets 1c and 1d of the movable element 1. In order that the formed angles may have appropriate values, it is sufficient that the tooth parts 21a and 22a of the stator 2 as well as the armature yokes 1b and the permanent magnets 1c and 1d of the movable element 1 are individually skewed.

Embodiment 6

Figure 17:
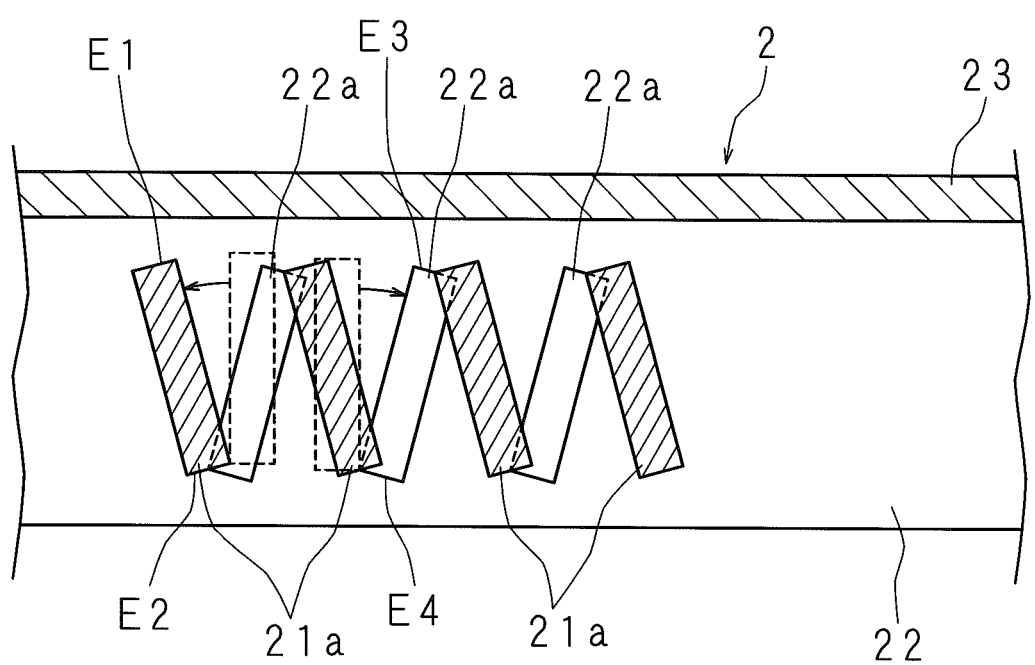
FIG. 17 is a sectional view illustrating a configuration of a stator of a linear motor according to Embodiment 6.

FIG. 17 is a sectional view illustrating the configuration of a stator 2 of a linear motor according to Embodiment 6. This figure illustrates a transverse sectional view obtained by sectioning the stator 2 of the linear motor along the moving direction of the movable element 1. The tooth parts 21a provided in the upper plate part 21 and the tooth parts 22a provided in the lower plate part 22 are in a skew arrangement. That is, the tooth parts 21a and the tooth parts 22a of the stator 2 are arranged and inclined relative to the moving direction of the movable element 1. The movable element 1 is similar to any one of Embodiments 1 to 4 given above and hence the description thereof is not given below.

In Embodiment 6, the direction of inclination of the cross sectional shorter sides in the tooth parts 21a of one plate-shaped part 21 is set reverse to that in the tooth parts 22a of the other plate-shaped part 22. As illustrated in FIG. 17, the cross sectional shorter sides E1 and E2 of the tooth part 21a and the end surface shorter sides E3 and E4 of the tooth part 22a are inclined relative to the moving direction of the movable element 1. This point is similar to Embodiment 5 described above. In Embodiment 6, the tooth part 21a and the tooth part 22a have inclination directions reverse to each other. That is, the inclination direction of the cross sectional shorter sides E1 and E2 of the tooth part 21a is set reverse to the inclination direction of the cross sectional shorter sides E3 and E4 of the tooth parts 22a. The purpose of this is to suppress a twist caused by employing a skew arrangement. When the tooth parts 21a and 22a are in a skew arrangement, the thrust force obtained in the linear motor is generated in a direction inclined from the moving direction of the movable element 1 by the skew angle. Thus, in some cases, an inclination twist is generated in the entirety of the movable element 1. When the inclination directions of the tooth part 21a and the tooth part 22a are set reverse to each other, the thrust force components in a direction (the transverse direction) perpendicular to the moving direction of the movable element 1 generated by the tooth part 21a and the tooth part 22a is reversed to each other. Thus, the transverse thrust force components cancel out each other and hence a twist may be prevented.

As described above, in Embodiment 6, in addition to the effects in the linear motor according to Embodiments 1 to 4, the following effects are obtained. Since the tooth parts 21a and the tooth parts 22a of the stator 2 are in a skew arrangement, the twelfth or higher harmonic components of the detent force may be reduced even when the armature yokes 1b (10b) and the permanent magnets 1c and 1d of the movable element 1 are not skewed. Further, since the inclination directions of the tooth part 21a and the tooth part 22a are set reverse to each other, an effect of preventing a twist is obtained.

Here, also in Embodiment 6, similarly to Embodiment 5, the movable element 1 in Embodiment 4 may be employed. Then, it is sufficient that the skew angles of the armature yokes 1b and the permanent magnets 1c and 1d of the movable element 1 as well as the tooth parts 21a and 22a of the stator 2 are defined suitably.

The technical features (the component features) described in the individual embodiments may be combined with each other. When combined, a new technical feature may be constructed.

It is to be regarded that the embodiments disclosed herein are illustrative at all points and not restrictive. It is intended that the scope of the present invention is set forth by the claims not by the meaning given above and includes all changes within the meaning and the scope equivalent to the scope of the claims.

The invention claimed is:

1. A linear motor comprising:
a movable element in which, inside a coil, two magnets magnetized along a moving direction and having magnetization directions opposite to each other and three yokes are alternately arranged along the moving direction; and
a stator including: two plate-shaped parts elongated in the moving direction of the movable element and facing to each other so as to be magnetically linked in such a manner that a movement domain of the movable element is located in between; and a plurality of tooth parts provided in each of surfaces facing each other in the two plate-shaped parts and aligned in the moving direction such that those provided in one plate-shaped part and those provided in the other plate-shaped part are located in a staggered manner;
wherein
the two magnets and three yokes have substantially a same length in a direction normal to the surfaces of the two plate-shaped parts facing each other.

2. The linear motor according to claim 1, wherein the yoke located between the two magnets is longer in the moving direction than the other two yokes.

3. The linear motor according to claim 2, wherein the length in the moving direction of the yoke located between the two magnets is twice the length of the other two yokes.

4. The linear motor according to claim 1, wherein a width in the alignment direction of the tooth parts is longer than an alignment interval of the tooth parts.

5. The linear motor according to claim 1, wherein the two magnets and the three yokes form a rectangular parallelepiped shape and the surface on the moving direction side of each magnet and each yoke is inclined relative to a direction perpendicular to the moving direction and perpendicular to the facing direction of the plate-shaped parts.

6. The linear motor according to claim 1, wherein:
the tooth part has a rectangular parallelepiped shape; and
any two sides facing each other in a cross section parallel to the plate-shaped part of the tooth part are inclined relative to the moving direction.

7. The linear motor according to claim 6, wherein in the tooth parts provided in the two plate-shaped parts, inclination directions of the two sides of the cross section are opposite to each other.

8. The linear motor according to claim 1, including:
a plate-shaped non-magnetic material plate provided between the coil and the side surface parallel to the moving direction of the yoke and the magnet; and an auxiliary plate composed of a plate-shaped non-magnetic and electrically non-conductive material provided in a space between the auxiliary plate and the coil so as to face the non-magnetic material plate with the yoke and the magnet in between.

9. The linear motor according to claim 8, further including
a linkage part linked to the non-magnetic material plate and linking three movable elements arranged in the moving direction.

10. The linear motor according to claim 9, wherein the non-magnetic material plate includes:
a first protruding plate part and a second protruding plate part having plate shapes and facing each other with a winding part of the coil in between; and
a base part joining the first protruding plate part and the second protruding plate part.

11. A linear motor comprising:
a movable element in which, inside a coil, a plurality of magnets magnetized along a moving direction and having magnetization directions opposite to each other and a plurality of yokes are alternately arranged along the moving direction; and
a stator including: two plate-shaped parts elongated in the moving direction of the movable element and facing to each other so as to be magnetically linked in such a manner that a movement domain of the movable element is located in between; and a plurality of tooth parts provided in each of surfaces facing each other in the two plate-shaped parts and aligned in the moving direction such that those provided in one plate-shaped part and those provided in the other plate-shaped part are located in a staggered manner;
wherein
the linear motor further comprises a plate-shaped non-magnetic material plate provided between the coil and the side surface parallel to the moving direction of the yoke and the magnet, and an auxiliary plate composed of a plate-shaped non-magnetic and electrically non-conductive material provided in a space between the auxiliary plate and the coil so as to face the non-magnetic material plate with the yoke and the magnet in between, and
wherein
the non-magnetic material plate includes:
a first protruding plate part and a second protruding plate part having plate shapes and facing each other with a winding part of the coil in between; and
a base part joining the first protruding plate part and the second protruding plate part.

12. The linear motor according to claim 11, further comprising a linkage part linked to the non-magnetic material plate and linking three movable elements arranged in the moving direction.

* * * * *